(12) United States Patent
Lippert et al.

(10) Patent No.: US 7,017,061 B2
(45) Date of Patent: Mar. 21, 2006

(54) METHOD AND SYSTEM FOR DYNAMICALLY ADJUSTING POWER CONSUMPTION OF AN INFORMATION HANDLING SYSTEM

(75) Inventors: Kurt J. Lippert, Austin, TX (US); Loren Fredlund, Austin, TX (US); Nathan Vecera, Lexington, TX (US); Kendall C. Witte, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 433 days.

(21) Appl. No.: 10/442,717

(22) Filed: May 21, 2003

(65) Prior Publication Data

US 2004/0236969 A1 Nov. 25, 2004

(51) Int. Cl.
*G06F 1/13* (2006.01)
(52) U.S. Cl. .................... 713/324; 713/320; 713/322; 713/323; 713/330; 713/340
(58) Field of Classification Search ................ 713/300, 713/320, 322–324, 340, 330
See application file for complete search history.

(56) References Cited

U.S. PATENT DOCUMENTS

| | | | | |
|---|---|---|---|---|
| 5,167,024 A | * | 11/1992 | Smith et al. ................ | 713/322 |
| 5,903,764 A | | 5/1999 | Shyr et al. ............. | 395/750.01 |
| 5,915,120 A | * | 6/1999 | Wada et al. ................ | 713/310 |
| 5,944,831 A | | 8/1999 | Pate et al. .................. | 713/324 |
| 5,964,879 A | * | 10/1999 | Dunstan et al. ............. | 713/340 |
| 6,044,443 A | | 3/2000 | Kim ........................... | 711/154 |
| 6,321,341 B1 | | 11/2001 | Kamijo et al. .............. | 713/340 |
| 6,329,794 B1 | * | 12/2001 | Oeda et al. .................. | 320/132 |
| 6,472,848 B1 | * | 10/2002 | Stryker et al. .............. | 320/135 |
| 6,594,771 B1 | * | 7/2003 | Koerber et al. ............. | 713/330 |
| 6,661,204 B1 | * | 12/2003 | Malcolm ..................... | 320/136 |
| 6,697,953 B1 | * | 2/2004 | Collins ........................ | 713/320 |
| 6,828,760 B1 | * | 12/2004 | Massey et al. .............. | 320/127 |
| 2002/0099962 A1 | * | 7/2002 | Nakamura .................. | 713/300 |
| 2002/0108070 A1 | * | 8/2002 | Oh .............................. | 713/600 |
| 2003/0126474 A1 | * | 7/2003 | Sawyers et al. ............ | 713/300 |

* cited by examiner

*Primary Examiner*—A. Elamin
(74) *Attorney, Agent, or Firm*—Hamilton & Terrile, LLP; Robert W. Holland

(57) ABSTRACT

A power consumption manager reduces inadvertent information handling system shutdowns by monitoring current discharge from a battery and commanding selected components of the information handling system to operate in a reduced power mode if current discharge exceeds a warning threshold. The power consumption manager recovers the selected components from the reduced power mode if the current discharge from the battery remains less than a recovery threshold. Monitoring of current discharge reduces inadvertent shutdowns from temporary surges in power demand from the battery and allows implementation of a reduced power configuration for the information handling system as total power discharge capacity of the battery drops with total charge available due to use of the battery over time.

18 Claims, 2 Drawing Sheets

METHOD AND SYSTEM FOR DYNAMICALLY ADJUSTING POWER CONSUMPTION OF AN INFORMATION HANDLING SYSTEM

BACKGROUND OF THE INVENTION

1. Field of the Invention

The present invention relates in general to the field of information handling system power consumption, and more particularly to a method and system for dynamically adjusting power consumption of an information handling system based on power source capability.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems have steadily improved in capability over the past several years due in large part to improvements in the speed at which processing components operate. For example, semiconductor devices have evolved to include greater numbers of circuits that operate at faster clock speeds, resulting in faster and more powerful processors to handle, transfer and display information. However, as information handling system components improve in speed and capability they also tend to increase the power that they consume. Power consumption of components becomes a concern where an information handling system operates on internal power, such as with portable information handling systems that operate on a battery. Manufacturers attempt to minimize the size of portable information handling systems by limiting the size of internal batteries and conserving power consumption to help a battery charge last. "Smart" batteries communicate information about their battery charge state to information handling systems so that the information handling system may shut down before the battery charge expires. Absent the communication of charge information from a battery to an information handling system, an involuntary shutdown generally occurs without an opportunity to save existing data and with an increased risk of damage to electronic components.

One difficulty with designing an information handling system to run on internal battery power is selecting a battery having a maximum discharge rate that exceeds the power consumption of the information handling system. For instance, as the power consumed by individual components of an information handling system have increased, variations in the power consumed by a complete system have also increased. If components demand a surge of power from the battery, the maximum discharge rate of the battery may be exceeded even though the battery capacity has not discharged sufficiently to trigger an automatic shutdown. The selection of a battery is further complicated because battery discharge current is typically not consistently proportional to the power provided by a battery and increases over battery use. The maximum power a battery can supply generally decreases as the battery discharges because the voltage provided by each cell decreases as it discharges and a fixed maximum current is generally enforced for each cell to safely provide. Thus, information handling systems that experience spikes in power consumption that exceed their battery's reduced discharge capacity are subject to unpredictable shutdowns even though battery charge remains.

SUMMARY OF THE INVENTION

Therefore a need has arisen for a method and system which dynamically monitors information handling system power consumption to adjust power draw by components from a battery to avoid unintended shutdowns.

A further need exists for a method and system which adjusts an information handling system's power consumption configuration to limit battery discharge below available capacity.

In accordance with the present invention, a method and system are provided which substantially reduce the problems and disadvantages associated with previously known methods and systems for managing internal power of an information handling system. A power consumption manager monitors an internal power discharge state and adjusts power consumption of information handling system components to maintain discharge current of the internal power below a maximum capacity.

More specifically, a power consumption manager interfaces with battery sensors to monitor the discharge current from the battery. If the battery discharge current exceeds a warning threshold current, the power consumption manager commands one or more selected information handling system components to enter a reduced power consumption mode so that current drawn from the battery remains at least a predetermined margin below maximum current discharge capacity of the battery. If the battery discharge current remains below a recovery threshold current, the power consumption manager commands the components to recover from the reduced power mode. The power consumption manager may use predefined warning and recovery threshold currents or may compute current values based upon the state of the charge remaining on the battery. As an example, in one embodiment, the power consumption manager commands a CPU to operate at a reduced clock speed if the information handling system transitions from external to internal power. Once the power consumption manager determines that the current discharge is below a recovery threshold, the CPU is commanded to recover to normal clock speed. The power consumption manager then periodically compares current discharge with a warning threshold discharge at a defined time interval and commands the CPU to return to reduced clock speed if current discharge exceeds the warning threshold until the current falls below the recovery threshold.

The present invention provides a number of important technical advantages. One example of an important technical advantage is that information handling system power consumption is dynamically monitored to adjust power draw from a battery to avoid unintended shutdowns. If current draw from a battery approaches a predetermined level, information processing components are shifted to a lower power consumption operating mode so that total power consumption will not exceed battery capacity. For instance, CPU clock speed is reduced to reduce overall power consumption below a desired threshold that gives sufficient excess battery current discharge capacity to avoid an inadvertent shutdown of the information handling system from a power demand surge. If current draw drops, such as upon completion of a high discharge activity, then the information processing components may be transitioned to return to the higher power consumption operation.

Another example of an important technical advantage is that an information handling system's power consumption configuration is adjusted to limit battery discharge below available battery discharge capacity. Battery discharge capacity is monitored to detect if battery discharge has reduced power available to support current draw at a predetermined level. Once the predetermined level is detected, the power configuration of the information handling system is adjusted to reduce power consumption, such as by setting processing components to operate in reduced power consumption modes like lower clock speeds or reduced brightness for illumination of displays. The power configuration is thus adjustable to concentrate power for selected functions, such as display, with reduced power to other functions, such as processor speed.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Inadvertent information handling system shutdowns due to power surges that temporarily overcome a battery's capacity to provide current are prevented by dynamically adjusting power consumption of information handling system components to maintain total power consumption of the information handling system within the battery's capacity to discharge current. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
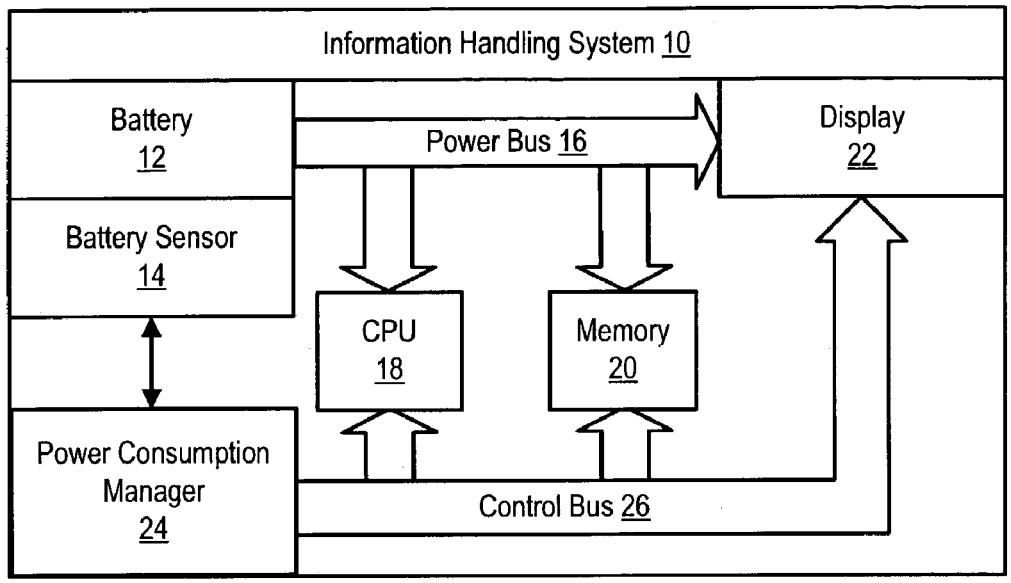
FIG. 1 depicts a block diagram of an information handling system having dynamic power consumption management.

Referring now to FIG. 1, a block diagram depicts an information handling system 10 configured to dynamically adjust power consumption of components to prevent inadvertent shutdowns caused by over drawing current from a battery 12. Battery sensors 14 monitor the battery discharge state of battery 12, such as total charge remaining and current discharge through power bus 16 to provide power to information handling system components including a CPU 18, memory 20 and display 22. A power consumption manager 24 interfaces with battery sensors 14 and apply the measurements of the battery discharge state to manage power consumption by the components through a control bus 26. For instance, power consumption manager 24 is a firmware module operating on a microprocessor that commands desired power consumption modes in the components to provide power consumption of at least a desired margin below maximum battery current discharge capacity.

Figure 2:
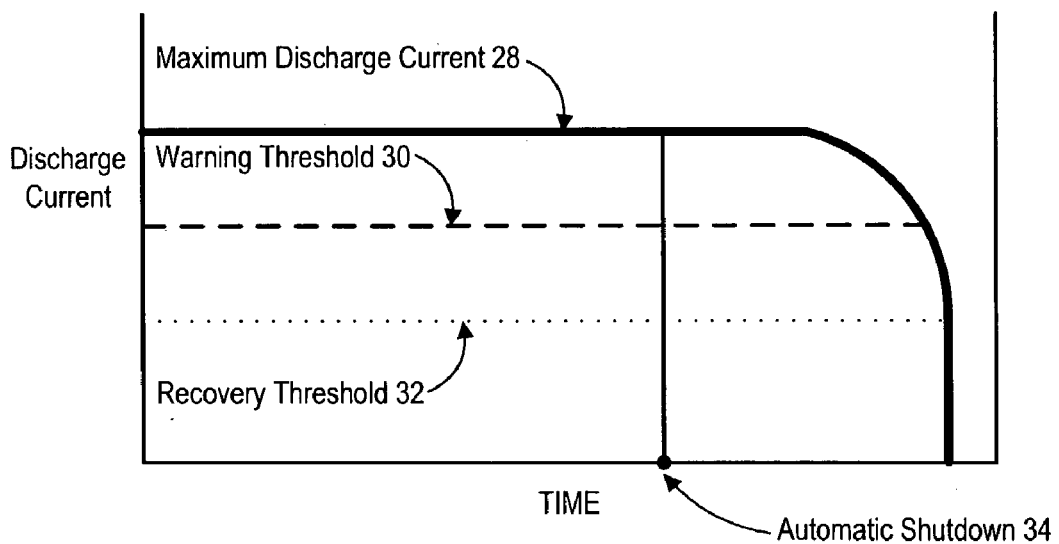
FIG. 2 depicts exemplary power consumption thresholds.

Referring now to FIG. 2, a graph depicts an example of current discharge measurements and thresholds for an information handling system battery. The maximum discharge power producible by the battery decreases over time as the battery discharges so that the current provided by a battery to produce a given power level approaches the maximum discharge current 28 producible by the battery. An automatic shutdown point 34 is defined at a discharge state just before the maximum available discharge power drops below an amount sufficient to operate the information handling system, such as when battery current exceeds a fixed level. If a power demand fluctuation occurs before automatic shutdown which draws current greater than maximum discharge current 28, an inadvertent shutdown occurs due to a power shortage. In order to prevent an inadvertent shutdown, power consumption manager 24 controls power consumption modes of information handling system components to maintain power consumption below a warning threshold current 30. In order to minimize the impact on information handling system operations, power consumption manager 24 recovers components from reduced power modes if current discharge falls below recovery threshold 32. The warning and recovery thresholds may be set at a predetermined value to provide a sufficient margin for avoiding shutdown across all battery charge states or may be calculated to adjust for reduced battery current discharge capacity as total battery charge decreases so that approximately the same margin is maintained between maximum current discharge and the warning threshold current.

Power consumption manager 24 prevents inadvertent information handling system shutdowns by command one or more selected components to enter a reduced power consumption mode if battery sensors 14 detect a current discharge from battery 12 that exceeds warning threshold current 30. As an example, power consumption by CPU 18 is reduced by commanding a battery optimized mode or by reducing operating clock speed. Alternatively, operating clock speed of memory 20 is reduced or brightness of display 22 is reduced. Power consumption manager 24 may reduce power consumption by individual components, including powering components completely off, or may set a power configuration in which power consumption of plural components is set. Further, power consumption manager 24 may select components based on the function being performed by information handling system 10. For instance, if a presentation application such as Power Point is selected, power consumption manager 24 may reduce power consumption by processor 18 while maintaining display 22 at its current illumination brightness to avoid interruption of the presentation. Power consumption manager recovers the selected components from the reduced power modes if battery sensors 14 detect current draw of less than recovery threshold 32 so that the user experience with information handling system 10 has minimal interference.

Figure 3:
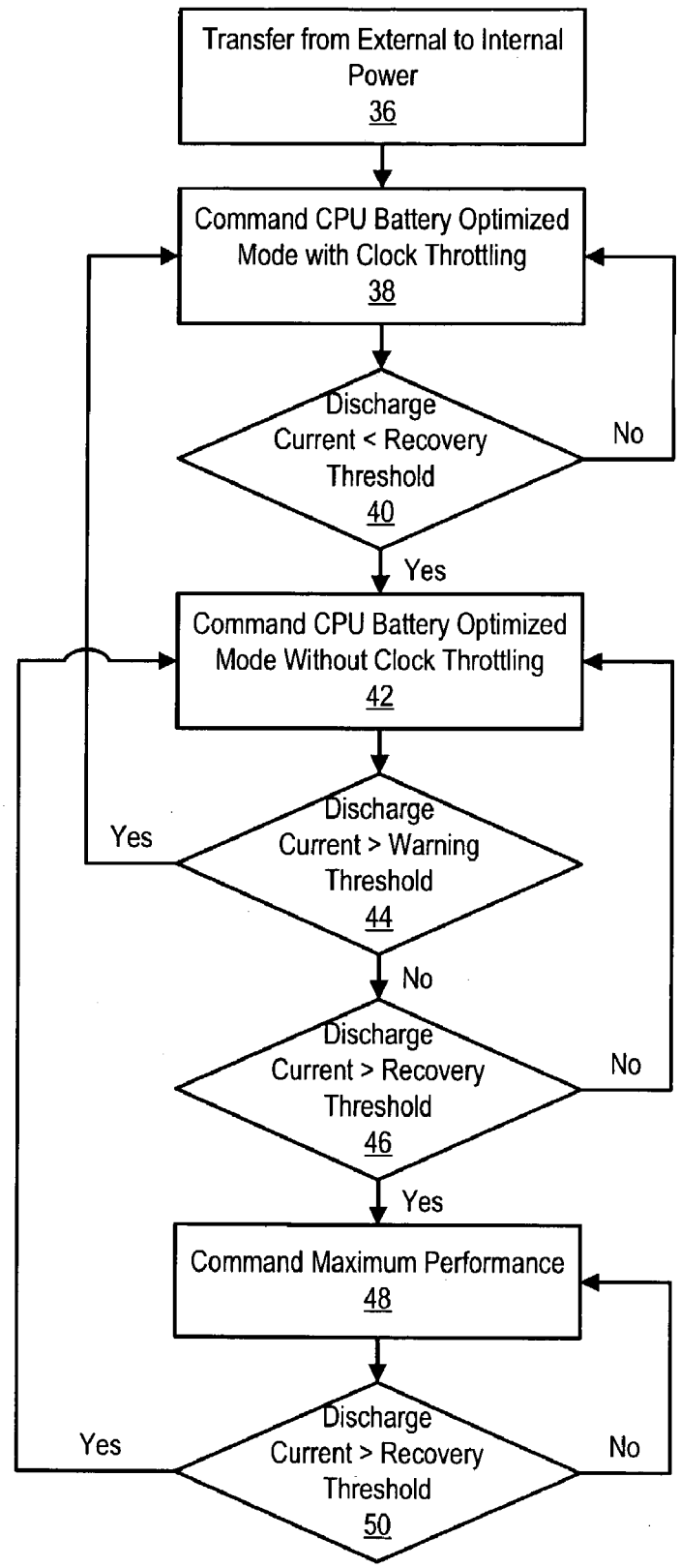
FIG. 3 depicts a flow diagram of a process for dynamic adjustment of power consumption.

Referring now to FIG. 3, a flow diagram depicts one embodiment of a process for adjusting power consumption by a CPU to prevent current draws in excess of a battery's maximum current discharge capacity. The process begins at step 36 with a determination that the information handling system has transferred from external power to internal power. At step 38, power consumption manager 24 commands CPU 18 to a minimal power consumption mode, such as the battery optimized mode available with certain Pentium processors and a clock throttling that further reduces CPU power consumption. Immediate initiation of a reduced power mode is performed shortly after transfer to internal power to avoid an inadvertent shutdown since, at the time of system transition to internal power system power consumption is unknown as is the amount of current that the battery will have to supply. At step 40, power consumption manager 24 compares the discharge current with the recovery threshold current to see if the discharge current remains below the recovery threshold for a predetermined time period, such as eight seconds. If the discharge current is greater than the recovery threshold, the process returns to step 38 and repeats at regular time periods until discharge current is less than the recovery threshold, in which case the process continues to step 42.

At step 42, power consumption manager 24 commands CPU 18 to recover from clock throttling but remain in the battery optimized mode, thus increasing the power consumed by CPU 18 and the overall power consumed by information handling system 10. At step 44, power consumption manager 24 determines if the discharge current is greater than the warning threshold current and, if so, the process returns to step 38 for a reduction in power consumption. In one embodiment, power consumption manager 24 compares the current discharge current with the warning threshold discharge current at regular time intervals, such as every two seconds. If the discharge current is less than the warning threshold at step 44, the process continues to step 46 to compare the discharge current with the recovery threshold. If the discharge current exceeds the recovery threshold, the process returns to step 42. If the discharge current is less than the recovery threshold, the process proceeds to step 48 at which power consumption manager 24 commands maximum CPU performance. At regular time intervals, such as every two seconds, the process continues to step 50 to determine if the discharge current exceeds the warning threshold current. If the warning threshold current is exceeded, the process returns to step 42 to reduce power consumption by commanding CPU 18 to enter a reduced power mode. If the warning threshold current is not exceeded, the process returns to step 48 to continue operations in the maximum performance CPU power consumption mode. In one embodiment, detection of power consumption above a warning threshold is performed more frequently than detection of power consumption below the recovery threshold, such as every two seconds versus every 16 seconds.

Although the present invention has been described in detail, it should be understood that various changes, substitutions and alterations can be made hereto without departing from the spirit and scope of the invention as defined by the appended claims.

What is claimed is:

1. An information handling system comprising:
   plural processing components operable to process information, at least some processing components having one or more reduced power consumption modes;
   a battery interfaced with the processing components and operable to provide power to the processing components;
   a battery sensor associated with the battery and operable to measure battery discharge state; and
   a power consumption manager interfaced with the battery sensor and the processing components, the power consumption manager operable to command one or more processing components to a reduced power mode upon measurement of a predetermined battery discharge state, the reduced power mode reducing total power consumption to at least a predetermined margin below a maximum battery discharge capacity, the power consumption manager selecting the processing components to command to a reduced power mode based on a type of function running on the information handling system.

2. The information handling system of claim 1 wherein the predetermined battery discharge state comprises a predetermined battery discharge current.

3. The information handling system of claim 2 wherein the power consumption manager is further operable to compute the predetermined battery discharge current based on the total remaining battery charge.

4. The information handling system of claim 1 wherein the processing components comprise a CPU and the reduced power mode comprises throttling CPU clock speed.

5. The information handling system of claim 1 wherein the processing components comprise a CPU and the reduced power mode comprises a battery optimized mode.

6. The information handling system of claim 1 wherein the processing components comprise a display and the reduced power mode comprises reduced display brightness.

7. The information handling system of claim 1 wherein the power consumption manager is further operable to periodically compare battery discharge current with a warning threshold current, the power consumption manager commanding the reduced power mode if the battery discharge current exceeds the warning threshold.

8. The information handling system of claim 7 wherein the power consumption manager is further operable to periodically compare battery discharge current with a recovery threshold current, the power consumption manager commanding recovery from the reduced power mode if the battery discharge current remains below the recovery threshold current.

9. The information handling system of claim 1 wherein the type of function running on the information handling system comprises a type of application running on the information handling system.

10. A method for dynamically adjusting power consumption of an information handling system, the method comprising:
    periodically sensing discharge current of a battery powering the information handling system;
    comparing the sensed discharge current with a warning threshold current;

selecting one or more components to transition to a reduced power mode based on the type of function running on the information handling system; and commanding the selected one or more components of the information handling system to enter a reduced power mode if the sensed discharge current exceeds the threshold current.

11. The method of claim 10 further comprising:

comparing the sensed discharge current with a recovery threshold current; and commanding the one or more components of the information handling system to recover from the reduced power mode if the sensed discharge current remains below the recovery threshold current.

12. The method of claim 11 wherein the one or more components comprises a CPU and the reduced power mode comprises a reduced clock speed.

13. The method of claim 10 wherein selecting one or more components to transition to a reduced power state further comprises:

determining performance of an application running on the information handling system; and selecting components to enter a reduced power mode to have a reduced impact on the application performance.

14. The method of claim 11 wherein the one or more components comprises memory and the reduced power mode comprises reduced memory operating speed.

15. A system for dynamically adjusting power consumption of an information handling system, the system comprising:

current discharge sensors operable to determine the current draw from a battery powering the information handling system; and a power consumption manager interfaced with the current discharge sensors and operable to reduce power consumption of selected information handling system components if the current draw exceeds a warning current threshold and to increase power consumption of the selected information handling system components if current draw remains less than a recovery current threshold, the power consumption manager operable to select the components based on the type of application running on the information handling system.

16. The system of claim 15 wherein the current discharge sensor is further operable to determine transfer of an information handling system from external power to battery power and wherein the power consumption manager is further operable to reduce power consumption of selected information handling system components upon determination of a transfer from external to battery power.

17. The system of claim 15 wherein the power consumption manager is further operable to periodically compare the determined current draw and the warning current threshold at a predetermined time interval.

18. The system of claim 15 wherein the information handling system component comprises a CPU having plural power consumption modes.

* * * * *